United States Patent
Schmitt et al.

(10) Patent No.: US 8,950,101 B2
(45) Date of Patent: Feb. 10, 2015

(54) SIGHTING TELESCOPE WITH A REVERSAL-SYSTEM SUPPORT NOT REQUIRING A TIGHT FIT

(75) Inventors: Christoph Schmitt, Biebertal (DE); Jonas Hoeller, Butzbach (DE); Helke Karen Hesse, Giessen (DE)

(73) Assignee: Schmidt & Bender GmbH & Co. KG, Biebertal (DE)

( * ) Notice: Subject to any disclaimer, the term of this patent is extended or adjusted under 35 U.S.C. 154(b) by 782 days.

(21) Appl. No.: 13/041,627

(22) Filed: Mar. 7, 2011

(65) Prior Publication Data
US 2011/0239516 A1 Oct. 6, 2011

(30) Foreign Application Priority Data
Mar. 8, 2010 (DE) .......................... 10 2010 010 688

(51) Int. Cl.
*F41G 1/38* (2006.01)
*G02B 7/02* (2006.01)

(52) U.S. Cl.
CPC . *F41G 1/38* (2013.01); *G02B 7/023* (2013.01)
USPC .......................................................... 42/119

(58) Field of Classification Search
USPC ............ 42/119, 120, 122; 359/425, 811, 826
See application file for complete search history.

(56) References Cited

U.S. PATENT DOCUMENTS

| 5,671,088 A | 9/1997 | Mai et al. |
| 6,449,108 B1 | 9/2002 | Bell |
| 2006/0061883 A1 | 3/2006 | Lin |

*Primary Examiner* — Reginald Tillman, Jr.
(74) *Attorney, Agent, or Firm* — Clark & Brody

(57) ABSTRACT

The sighting telescope comprises an external tube and receives within it an inner tube that contains an optical reversal system with at least two optical elements which are fitted into optical mounts and are displaceably supported in the direction of the sighting telescope's longitudinal axis, as a result of which a displacement of the lenses causes a change in magnification, the mounts within a guide sleeve being supported while prestressed by an elastic device.

24 Claims, 4 Drawing Sheets

SIGHTING TELESCOPE WITH A REVERSAL-SYSTEM SUPPORT NOT REQUIRING A TIGHT FIT

The present invention relates to a sighting telescope having a reversal-system support defined in the preamble of claim 1.

As regards commercially available sighting telescopes such as used in firearms, the sighted target image is laterally inverted and upside down in the objective plane. To remedy such representation, an optical reversal system is usually used, to erect the image and reproduce it in the ocular plane where it is being observed. The reversal system consists of at least two optical elements, as a rule being the so-called cemented lens elements each of which is fixed in one optical mount (hereafter mount). A reticle is used in present-day sighting telescopes in the objective or ocular plane, the reversing system being configured in an inner tube of said telescope. The spacings between the components of the optical reversal system and the sighting telescope's objective plane may be varied. This feature allows varying the magnification.

The change of the spacing between the objective plane and the lens elements of the reversal system is usually implemented by displacing the lens mounts. Accordingly the inner tube of known sighting telescopes contains an adjustment device with which to control the positions of the reversal system lens elements. Usually this adjustment device is composed of a guide sleeve and at least two mounts which are configured within this sleeve and which hold the optical reversing system's lenses (simple or more complex). These mounts are displaceable within said sleeve along the sighting telescopes longitudinal axis, the mounts and the guide sleeve being supported to allow mutually sliding them. In order that such sliding support be quasi play-free, said mounts must be fitted in very precise manner into the guide sleeve.

This design incurs several drawbacks. On one hand fitting the mounts into the guide sleeve amounts to an additional procedure adversely affecting manufacturing time and costs. On the other hand the guide sleeve and the mounts fitted into position constitute a subassembly matched individually to each other. Manufacture therefore entails making very sure that the individual components indubitably can be associated with each other in the ensuing manufacturing steps. It is the only way to make sure that the specifically matched subassembly can be installed into an inner tube as designed. This circumstance not only is cumbersome, but also entails potentially higher risks of production defects: such a design is highly disadvantageous as regards quality assurance.

An easily running slide bearing as is constituted by the adjustment device of the reversing system entails using materials of low coefficients of friction. As regards the known sighting telescopes, such material requirements raise limitations on the materials available to manufacture the mounts and the guide sleeve. Illustratively many materials offering good sliding properties also may be materials of high specific weight. Consequently components made of such materials will be comparatively heavy.

Another significant factor is the cost of the selected materials. The known sighting telescopes frequently make use of high cost, high-performance steels or aluminum.

Accordingly the objective of the present invention is to overcome the above and further drawbacks of the state of the art and to create a sighting telescope comprising a low-friction, reversing-system bearing requiring no tight fit. This bearing/support moreover shall assure nearly play-free displacement of the mounts in the guide sleeve, and the sighting telescope shall be manufacturable economically while using simple means.

The main features of the present invention are defined in claim 1. Embodiment modes are defined in claims 2 through 13.

As regards a sighting telescope comprising an external tube enclosing an inner tube that receives an optical reversing system fitted with at least two optical components inserted mounts, said components being supported in displaceable manner in the longitudinal direction of the sighting telescope and by their displacement effecting a change in magnification, the present invention stipulates that said mounts are prestressed by an elastic device and rest within a guide sleeve.

Said elastic device causes the mounts to be prestressed within the guide sleeve. This feature allows compensating for finishing tolerances, and as a result tightly fitting the mounts into the guide sleeve is now superfluous. Thereby manufacturing has been significantly simplified. In this manner the elastic device assures the mount(s) shall constantly rest against the guide sleeve. Tilting or excentrically displacing the mounts within the guide sleeve are precluded.

The manufacturing process is further simplified by the design of the present invention in that the individual components of the sighting telescope's inner tube can be produced wholly independently from each other. Prior to the present invention, the mounts and the guide sleeve always were ground in interdependent manner. Each mount fitted only into one guide sleeve. This circumstance made standardized manufacturing almost impossible. The present invention considerably reduces the danger of production defects.

In one advantageous embodiment mode of the present invention, the mounts are fitted with outside surfaces. The mounts can slide on these outside surfaces along and on the guide sleeve. As a result tilting of the mount(s) relative to the guide sleeve is very nearly suppressed.

Preferably a recess is configured in at least one outside surface. This feature allows receiving in especially advantageous manner the device in the mount. The outside surface is easily accessible all round, and therefore the device can be inserted without any difficulty. Moreover the recess reduces the friction at the contact area between mount and guide sleeve as this area is reduced by the recess.

Advantageously said recess is a groove running parallel to the longitudinal axis. When the mounts are displaced within the guide sleeve, the elastic device is free of any shear forces. This design extends the elastic device's service life.

Preferably moreover, at least one mount is made of plastic. Again the friction between the mounts and the guide sleeve can be reduced considerably. The weight of the reversing system's weight is also reduced, hence that of the sighting telescope too.

In an especially preferred embodiment mode, the mount is made of polytetrafluoroethylene, polyoxymethylene, polyetheretherketone or polyvinylidenefluoride. These materials offer especially low coefficients of friction and high temperature resistance. This feature is one of the factors allowing reliable use of the sighting telescope under the most diverse climatic conditions. Again, mounts made of these materials when mechanically stressed offer a welcome low rate of abrasion, assuring thereby long-term and interference-free sliding support of the mounts in the guide sleeve.

As regards polytetrafluoroethylene, the static and sliding coefficients of friction are nearly equal. Mounts made of these materials allow very accurately adjusting the reversing system's optic components, foremost when small adjustments are carried out; the otherwise common jolts at the beginning of motion are absent.

In especially preferred manner, the elastic device is able to enter said recess. This feature facilitates reversing system installation. First the elastic device is inserted into the mount's recess. Thereupon said elastic device together with the already inserted elastic device can be inserted into the guide sleeve.

In one advantageous embodiment mode of the invention, the elastic device is made of plastic. This feature is especially appropriate, plastics offering unusually advantageous material properties as regards the desired application. Said properties include low friction and comparably low weight.

In a further development of this embodiment mode, the elastic device is made of polytetrafluoroethylene, polyoxymethylene, polyetheretherketone or polyvinylidenefluoride. This selection is especially advantageous because the elastic device made of such materials offers low friction and high temperature stability within a wide temperature range. Furthermore when mechanically stressed, elastic devices made of such materials nevertheless abrade little, offering long-lasting and interference-free support for the mounts.

In one important design of the sighting telescope of the invention, the elastic device is tubular. The desired compliance of the elastic device is attained in this manner at very low manufacturing cost. Finishing tolerances are effectively compensated, assuring excellent fit-accuracy and high ease of displacement. The tube provides resilient prestressing. The tube is swaged perpendicularly to its longitudinal direction during installation and will expand after assembly, thereby resting against the mount and the guide sleeve. In this manner the mounts are supported in prestressed manner within the guide sleeves.

In a further important embodiment mode, the elastic device is affixed to at least one mount. This design facilitates installation and prevents said inserted device from dropping out of the mount.

Preferably also, the guide sleeve is made of plastic. Such an embodiment is especially appropriate because plastics offer low coefficients of friction. Optionally the plastics' properties may be matched to the guide sleeve requirements by means of suitable admixtures.

Accordingly and preferably the guide sleeve is made of polytetrafluoroethylene, polyoxymethylene, polyetheretherketone or polyvinylidenefluoride. Such guide sleeves offer the substantial advantage of low weight and slight friction between the guide sleeve and the mount(s) among others.

Another significant embodiment mode of the present invention stipulates that the mounts are locally prestressed in one direction by the elastic device within the guide sleeve. In especially effectively manner, this design precludes undesired play of the bearing/support, respectively the preferred mount position in the guide sleeve is very effectively stabilized. In this respect a design of each mount comprising two recesses and two elastic devices is advantageous.

Moreover one embodiment mode wherein the elastic device entails point-like prestressing toward the bearing/support was found especially advantageous. The bearing tolerance is substantially less in the case of such a point-like prestressing than for one spread over some area that would subtend a comparatively wide equilibrium position. Such small tolerance allows a highly rigorous guidance of the mounts in the guide sleeve and is accordingly highly advantageous.

Preferably too, one drive pin is used to displace each of the mounts in the guide sleeve and is affixed to the pertinent mount, and the elastic device is configured in the mount to subtend with the associated drive pin an angle $\alpha$ of which the apex is the longitudinal axis A, said angle $\alpha$ being between 5° and 80°, preferably between 10° and 60°, more preferred between 15° and 50° and most preferred between 20° and 45°. In this embodiment the mount is forced against the opposite inside surface of the guide sleeve by the force exerted by the elastic device when said mount is inserted into said guide sleeve. As a result the mount's play is substantially reduced and tilting or tipping it is precluded most effectively when being displaced in the guide sleeve.

The said recess is circular in another embodiment mode of the invention. This feature was found especially advantageous regarding mount stabilization, which is very important for play-free displacements. In the simplest case, a circular recess may made by drilling a borehole, and therefore such a design is highly advantageous in manufacturing.

Another embodiment mode however stipulates that the elastic device be spherical. A spherical elastic device being able to withstand the same force omni-directionally, the relative orientation assumed by such an elastic device in the mount is of no consequence. Such a design therefore simplifies manufacturing and moreover minimizes any source of defects.

Further features, particulars and advantages of the present invention are discussed in the claims and in the descriptions below of illustrative embodiment modes in relation to the appended drawings.

FIG. 1 shows a cross-section of a sighting telescope 10 of the invention.

Figure 1:
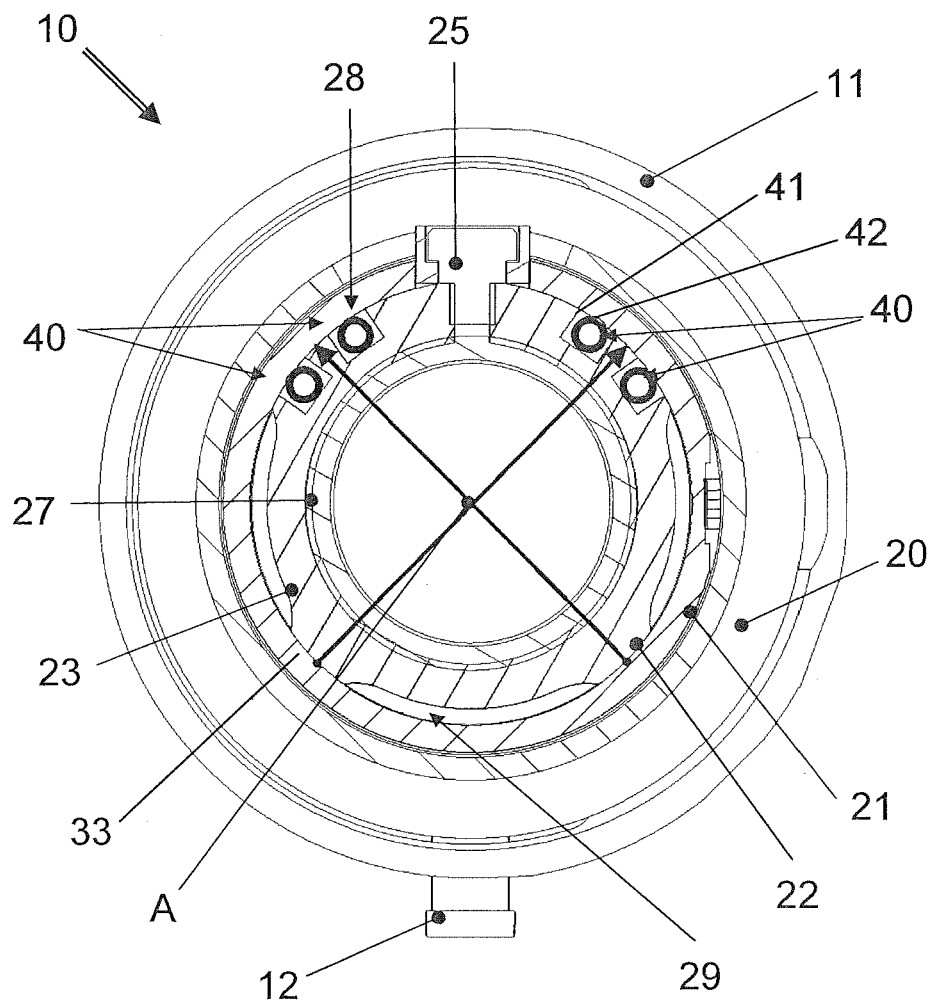
FIG. 1 is a cross-section of a sighting telescope of the invention.

The sighting telescope 10 comprises an external tube 11 concentrically receiving an inner tube 20. An adjustment turret 12 is configured at the external tube 11 and passes through it as far as the inner tube 20, allowing adjusting the inner tube 20 for instance to compensate for crosswinds. Depending on the application, the sighting telescope 10 also may be equipped with further adjustment turrets. A worm sleeve 21, a guide sleeve 22 and a first mount 23 are configured mutually concentrically in the inner tube 20. The worm sleeve 21 is supported to be rotatable about the longitudinal axis A and the guide sleeve 22 is affixed by a ball joint to the inner tube 20.

Along the longitudinal axis A, the worm sleeve 21 comprises a helical recess receiving a drive pin 25. The guide sleeve 22 is located inside the worm sleeve 21. Along the longitudinal axis A, the guide sleeve 22 comprises a linear recess 32 within which the drive pin 25 also is displaceably supported. The mount 23 is situated in the guide sleeve 22. The drive pin 25 is firmly affixed to the mount 23. When rotating the sleeve 21, the drive pin 25 together with the mount 23 moves simultaneously in the guides of the worm sleeve 21 and guide sleeve 22. The cooperation between the worm-like guidance of the driver pin 25 in the worm sleeve 21 with the linear guidance of the driver pin 25 in the guide sleeve 22 therefore creates a means to convert a rotation of the worm sleeve 21 about the axis of rotation into a displacement of the mount 23 along the longitudinal axis A.

Only one mount 23 is shown in said cross-section, as well as its associated drive in 25, though the sighting telescope 10 contains as a whole at least two mounts with two drive pins each being displaceably supported within helical recesses of the worm sleeve 21. Moreover the sighting telescope 10 includes an omitted operating element which rotates the worm sleeve 21 relative to the guide sleeve 22.

The first mount 32 comprises in its outer surface 33 a total of four recesses 28. In the particular embodiment shown, the elastic device 40 is inserted into said recesses 28. As it is inserted, the elastic device 40 elastically prestresses the first mount 23 against the guide sleeve 22.

In this shown embodiment mode, the elastic device 40 is constituted by four tubular inserts 41. These inserts 41 project slightly above the recesses 28 and implement elastic prestressing between the mount 23 and the guide sleeve 22. The compliance of the elastic device 40 is critically affected by the cavity 42 in the inserts.

A pre-screwing ring 27 is configured in the first mount 23 and affixes at least one lens of the reversing system. Compared to the case of the circular design, the first mount 23 comprises three notches 29 besides the recess 28 in its outer surface 33. The sliding friction between the first mount 23 and the guide sleeve 22 depends on the area of contact between the two components. The notches 29 are used to lower the frictional resistance of the slide bearing.

Figure 2:
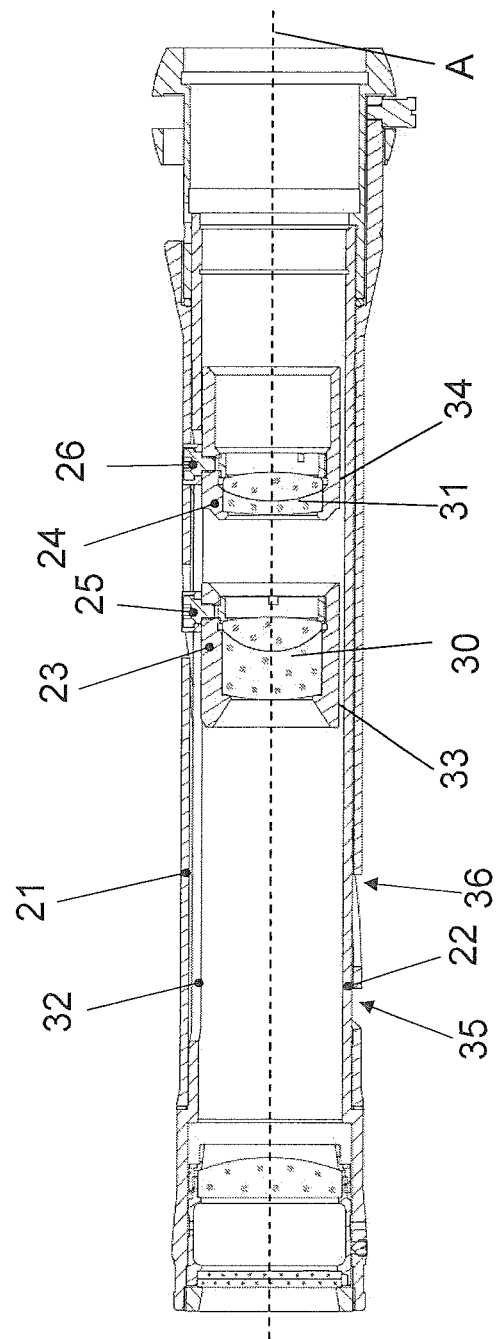
FIG. 2 is a longitudinal section of a reversing system of a sighting telescope of the invention.

FIG. 2 is a longitudinal section of a reversal system of a sighting telescope 10 of the invention. This longitudinal section shows a worm sleeve 21 receiving a guide sleeve 22. A first mount 23 with a first lens 30 and a second mount 24 with a second lens 31 are concentrically configured in the guide sleeve 22.

A first drive pin 25 is displaceably supported along the longitudinal axis A in a first helical recess 35 in the worm sleeve 21; a second drive pin 24 is displaceably supported along the longitudinal axis A in a further helical recess 36. The first drive pin 25 is affixed in the first mount 23; the second drive pin 26 is affixed in the second mount 24. The helical recesses 35, 36 in the worm sleeve 21 preferably are elongated slots. The guide sleeve 22 comprises a linear recess 32 running parallel to the longitudinal axis A of the sighting telescope 10. The first drive pin 25 and the second drive pin 26 are displaceably supported in said linear recess. The guide sleeve 22 is affixed by a ball joint to the inner tube 20. The mounts 23 and 24 can be displaced along the longitudinal axis A by rotating the worm sleeve 21 in the guide sleeve 22. The sighting telescope 10 comprises a means rotating the worm sleeve 21. Said means, for instance an adjustment ring, preferably is configured on the external tube.

Figure 3:
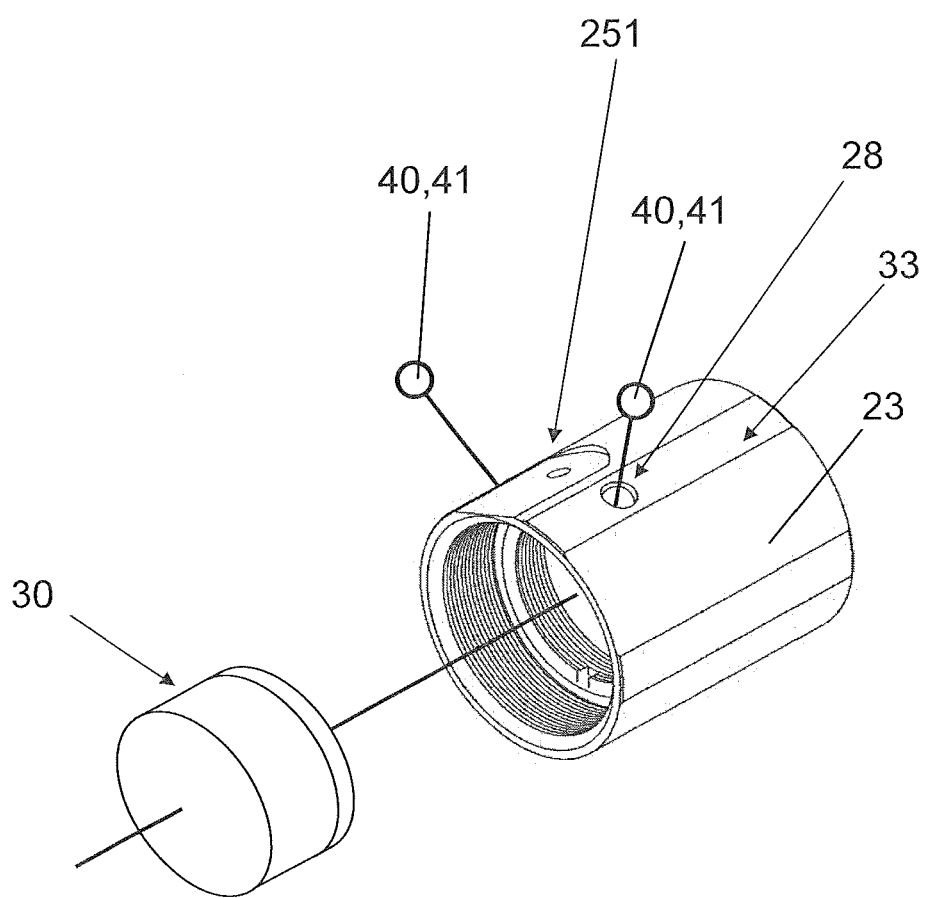
FIG. 3 is an exploded view of a mount of a sighting telescope of the invention.

FIG. 3 is a detailed view of a mount 23 of a sighting telescope of the invention, with an optical element 30 and two spherical inserts 41 of an elastic device 40 prestressing the support of the mount 23 within an omitted guide sleeve.

Two circular recesses 28 in an outer surface 33 of the mount 23 are designed to receive the two spherical inserts 41 of the elastic device 40. These recesses 28 are designed in a manner that in their inserted state, the inserts 41 each slightly project above the mount 23 and thereby generate prestressing between the mount 23 and a guide sleeve of the sighting telescope of the invention. An affixation element 251 is configured between the two recesses 28, by means of which an omitted drive pin can be firmly affixed, for instance by a thread, to the mount 23.

Figure 4:
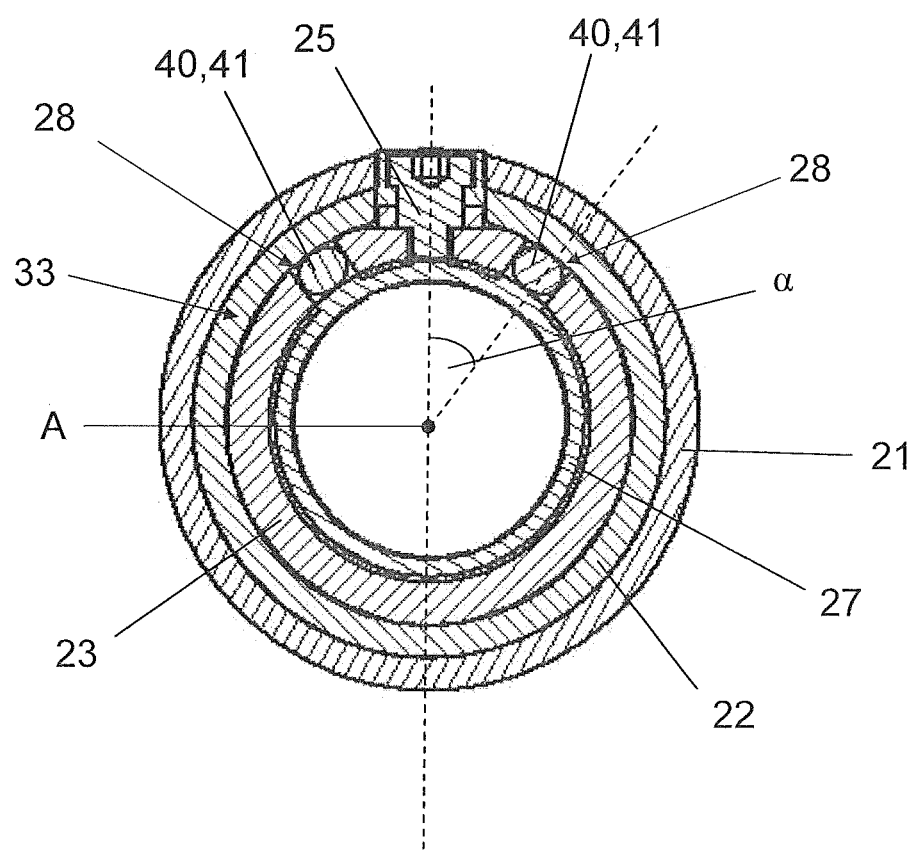
FIG. 4 is a detailed view of a sighting telescope of the invention with a mount installed in a guide sleeve.

FIG. 4 is a detailed cross-sectional view of a sighting telescope of the invention, with a mount 23 configured in a guide sleeve 22.

The guide sleeve 22 is concentrically configured within a worm sleeve 21. Both the guide sleeve 22 and the worm sleeve 21 comprise a recess in which a drive pin 25 is displaceably supported. The recess of the worm sleeve 21 is helical, that of the guide sleeve 22 is linear along a longitudinal axis A. The mount 23 is configured within the guide sleeve 22. The drive pin 25 is firmly joined to the mount 23. The drive pin 25 together with the mount 23 will move within the recesses of the worm sleeve 21 and the guide sleeve 22 when the worm sleeve 21 is rotated. Illustratively an adjustment ring easily accessible from the sighting telescope's outside may be used to rotate the worm sleeve 21. A pre-screwing ring 27 to receive an optical element is configured in the mount 23.

The mount 23 comprises an outer surface 33 into which are fashioned two circular recesses 28 receiving each a spherical insert 41 of the elastic device 40. The two recesses 28 are configured in the mount 23 in a manner that the two inserts 41 of the elastic device 40, together with the drive pin 25, each subtend an angle $\alpha$ relative to a longitudinal axis A which is the vertex of this angle; in this embodiment $\alpha$ is between 20° and 45°. For the sake of clarity, this angle $\alpha$ is only shown for the insert 41 on the right.

The two spherical inserts 41 elastically prestress the mount 23 against the guide sleeve 22. The prestressing force is point-like in one direction and consequently offers an especially narrow equilibrium position. This design attains therefore an especially small bearing/support tolerance respectively an especially accurate guidance of the mount 23 in the guide sleeve 22. The compliance of the elastic device 40 depends on the material of the inserts 41.

The present invention is not restricted to one of the above embodiment modes, instead it allows versatile modifications.

All features and advantages, including design details, spatial configurations and procedural steps, which are implicit from or explicit in the above description, may be construed being inventive per se or in arbitrary combinations.

LIST OF REFERENCES

A longitudinal axis
$\alpha$ angle
10 sighting telescope
11 external tube
12 adjustment turret
20 inner tube
21 worm sleeve
22 guide sleeve
23 first mount
24 second mount
25 first drive pin
251 affixation element
26 second drive pin
27 pre-screwing ring
28 recess
29 notch
30 first optical element
31 second optical element
32 linear recess
33 first outer surface
34 second outer surface
35 helical recess
36 helical recess
40 elastic device
41 inserts
42 cavity

The invention claimed is:

1. A sighting telescope (10) comprising an external tube (11) containing an inner tube (20), said inner tube comprising an optical reversal system with at least two optical elements (30, 31) fitted into two optical mounts (23, 24) displaceably supported in the direction of the sighting telescope's longitudinal axis (A), the displacement of the elements (30, 31) changing the magnification, wherein the mounts (23, 24) are supported within a guide sleeve (22), the mounts (23, 24) being prestressed by a spherical elastic device (40).

2. The sighting telescope (10) as claimed in claim 1, characterized in that the mounts (23, 24) comprise outer surfaces (33, 34).

3. The sighting telescope (10) as claimed in claim 1, characterized in that a recess (28) is present in at least one outside surface (33, 34).

4. The sighting telescope as claimed in claim 1, characterized in that the spherical elastic device (40) can be moved into the recess (28).

5. The sighting telescope (10) as claimed in claim 1, characterized in that the spherical elastic device (40) is made of plastic.

6. The sighting telescope (10) as claimed in claim 1, characterized in that the spherical elastic device (40) is made of polytetrafluoroethylene, polyoxymethylene, polyetheretherketone or polyvinylidenefluoride.

7. The sighting telescope (10) as claimed in claim 1, characterized in that the mounts (23, 24) are supported inside the guide sleeve (22) while being locally prestressed in one direction by the spherical elastic device (40).

8. The sighting telescope (10) as claimed in claim 7, characterized in that each mount (23, 24) comprises at least two recesses (28) and two spherical elastic devices (40).

9. The sighting device (10) as claimed in claim 7, characterized in that the spherical elastic device (40) is designed to generate a point-like prestressing toward a support/bearing located between the mount and the guide sleeve.

10. The sighting telescope (10) as claimed in claim 7, characterized in that a drive pin (25, 26) is each used to move the mounts (23, 24) in the guide sleeve (22) and is affixed to the particular mount (23, 24) and that the spherical elastic device (40) is configured in such a way in the mount (22, 23) that the spherical elastic device (40) subtends together with the associated drive pin (25, 26) an angle a of which the vertex is the longitudinal axis A, said angle a having its vertex at said axis and being in a range between 5° and 80.

11. The sighting telescope (10) as claimed in claim 3, characterized in that the recess (28) is circular.

12. The sighting telescope of claim 10, wherein the range is between 10° and 60°.

13. The sighting telescope of claim 12, wherein the range is between 15° and 50°.

14. The sighting telescope of claim 13, wherein the range is between 20° and 45°.

15. A sighting telescope (10) comprising an external tube (11) containing an inner tube (20), said inner tube comprising an optical reversal system with at least two optical elements (30, 31) fitted into two optical mounts (23, 24) displaceably supported in the direction of the sighting telescope's longitudinal axis (A), the displacement of the elements (30, 31) changing the magnification,
wherein the mounts (23, 24) are supported within a guide sleeve (22), the mounts (23, 24) being prestressed by an elastic device (40), wherein the mounts (23, 24) comprise outer surfaces (33, 34) and a circular recess (28) is present in at least one of the outside surfaces (33, 34) and further wherein the elastic device (40) is inserted into the circular recess.

16. The sighting telescope (10) as claimed in claim 15, characterized in that the elastic device (40) is made of plastic.

17. The sighting telescope (10) as claimed in claim 15, characterized in that the elastic device (40) is made of polytetrafluoroethylene, polyoxymethylene, polyetheretherketone or polyvinylidenefluoride.

18. The sighting telescope (10) as claimed in claim 15, characterized in that the mounts (23, 24) are supported inside the guide sleeve (22) while being locally prestressed in one direction by the elastic device (40).

19. The sighting telescope (10) as claimed in claim 15, characterized in that each mount (23, 24) comprises at least two circular recesses (28) and two elastic devices (40).

20. The sighting device (10) as claimed in claim 15, characterized in that the elastic device (40) is designed to generate a point-like prestressing toward a support/bearing located between the mount and the guide sleeve.

21. The sighting telescope (10) as claimed in claim 15, characterized in that a drive pin (25, 26) is each used to move the mounts (23, 24) in the guide sleeve (22) and is affixed to the particular mount (23, 24) and that the elastic device (40) is configured in such a way in the mount (22, 23) that the elastic device (40) subtends together with the associated drive pin (25, 26) an angle a of which the vertex is the longitudinal axis A, said angle a having its vertex at said axis and being in a range between 5° and 80°.

22. The sighting telescope of claim 21, wherein the range is between 10° and 60°.

23. The sighting telescope of claim 22, wherein the range is between 15° and 50°.

24. The sighting telescope of claim 23, wherein the range is between 20° and 45°.

\* \* \* \* \*